US005780553A

United States Patent [19]
DeSimone et al.

[11] Patent Number: 5,780,553
[45] Date of Patent: Jul. 14, 1998

[54] HETEROGENEOUS POLYMERIZATIONS IN CARBON DIOXIDE

[75] Inventors: Joseph M. DeSimone, Chapel Hill; Timothy J. Romack, Durham; Dorian A. Canelas, Chapel Hill, all of N.C.; Katherine A. Shaffer, Erie, Pa.

[73] Assignee: University of North Carolina at Chapel Hill, Chapel Hill, N.C.

[21] Appl. No.: 846,822

[22] Filed: Apr. 30, 1997

Related U.S. Application Data

[63] Continuation of Ser. No. 544,264, Oct. 17, 1995, abandoned, which is a continuation-in-part of Ser. No. 443,478, May 18, 1995, Pat. No. 5,589,105, which is a division of Ser. No. 378,550, Jan. 25, 1995, Pat. No. 5,506,317, which is a division of Ser. No. 299,516, Sep. 1, 1994, Pat. No. 5,451, 633, which is a division of Ser. No. 198,224, Feb. 17, 1994, Pat. No. 5,382,623, which is a division of Ser. No. 99,905, Jul. 30, 1993, Pat. No. 5,312,882.

[51] Int. Cl.$^6$ .................. C08F 259/00; C08F 275/00
[52] U.S. Cl. .................. 525/276; 525/288; 526/329.7; 526/279
[58] Field of Search .................. 525/276, 288; 526/329.7

[56] References Cited

U.S. PATENT DOCUMENTS

| | | | |
|---|---|---|---|
| 3,522,228 | 7/1970 | Fukui et al. | 260/94.9 |
| 4,429,666 | 2/1984 | Surace et al. | 123/41.05 |
| 4,592,933 | 6/1986 | Meyerson et al. | 427/255.1 |
| 4,746,714 | 5/1988 | Spinelli et al. | 525/286 |
| 4,748,220 | 5/1988 | Hartmann et al. | 526/89 |
| 4,933,404 | 6/1990 | Beckman et al. | 526/207 |
| 4,981,727 | 1/1991 | Brinduse et al. | 427/385.5 |
| 5,010,140 | 4/1991 | Antonelli et al. | 525/269 |
| 5,045,220 | 9/1991 | Harris et al. | 252/364 |
| 5,232,997 | 8/1993 | Itoh et al. | 525/477 |
| 5,292,843 | 3/1994 | Jenkins et al. | 526/318.5 |
| 5,312,882 | 5/1994 | DeSimone et al. | 526/201 |
| 5,382,623 | 1/1995 | DeSimone et al. | 524/557 |
| 5,496,901 | 3/1996 | DeSimone et al. | 526/89 |

FOREIGN PATENT DOCUMENTS

| | | |
|---|---|---|
| 314158A | 5/1989 | European Pat. Off. |
| 2212503 | 7/1989 | United Kingdom . |
| WO9209639A | 6/1992 | WIPO . |
| WO93/20116 | 10/1993 | WIPO . |

OTHER PUBLICATIONS

K.A. Shaffer and J.M. DeSimone; Chain Polymerizations in Inert Near-and Supercritical Fluids; *Polymer Science*, 3 No. 5; pp. 146–153 (1995).

S. Kawaguchi and M.A. Winnik; Dispersion Copolymerization of η-Butyl Methacrylate with Poly(ethylene oxide) Macromonomers in methanol-Water. Comparison of Experiment with Theory; *Macromolecules* 28 pp. 1159–1166 (1995).

S. Kobayashi et al; Preparation of Micron-Size Monodisperse Polymer Particles by Dispersion Copolymerization of Styrene with Poly(2-oxazoline) Macromonomer; *Journal of Polymer Science: Part A: Polymer Chemistry* 31, pp. 3133–3139 (1993).

S. Kobayashi et al.; Preparation of Micron-Size Monodisperse Poly(methyl Methacrylate) Particles Using Poly(2-oxazoline) Macromonomer; *Polymer International* 30 No. 2, pp. 265–270 (1993).

M.B. Urquiola et al; Emulsion Polymerization of Vinyl Acetate Using a Polymerizable Surfactant. I. Kinetic Studies; *Journal of Polymer Science: Part A; Polymer Chemistry* 30, pp. 2619–2629 (1992).

S. Kobayashi et al.; Preparation of Micron-size Monodisperse Polymer Particles by Dispersion Copolymerization of Methyl Methacrylate with Poly(2-oxazoline) Macromonomer; *Proe. Japan Acad.* 67; pp. 140–143 (1991).

K. Ito et al; Poly(ethylene oxide) macromonomers 5. Dodecyloxy poly(ethylene glycol) methacrylate as an amphiphilic macromonomer for dispersion polymerization; *Polymer Bulletin* 16; pp. 345–349 (1986).

J.C. Saam et al; Silicone-Stabilized Nonaqueous Emulsion Polymerization; *Journal of Applied Polymer Science* 18, pp. 2279–2285 (1974).

F.A. Adamsky and E.J. Beckman; Inverse Emulsion Polymerization of Acrylamide in Supercritical Carbon Dioxide; *Macromolecules*, 27, pp. 312–314 (1994).

R.H. Pelton et al; Silicone Stabilized Poly(Methyl Jethacrylate) Nonaqueous Latexes; *Journal of Colloid and Interface Science* 137, No. 1, pp. 120–127 (1990).

J.M. DeSimone et al; Dispersion Polymerizations in Supercritical Carbon Dioxide; *Science* 265, pp. 356–359 (1994).

J.M. DeSimone et al.; Synthesis of Fluoropolymers in Supercritical Carbon Dioxide; *Science* 257, p. 945 (1992).

V. Krukonis; Supercritical Fluid Chromatography Analysis of Polystyrene. *Polymer Fractionation* pp. 146–147, 156–159, 244–245, 248–249.

*Primary Examiner*—Joseph L. Schofer
*Assistant Examiner*—N. Sarofin
*Attorney, Agent, or Firm*—Myers, Bigel, Sibley & Sajovec, PA

[57] ABSTRACT

A method for the polymerization of a monomer is disclosed. The method includes (a) providing a reaction mixture comprising a monomer, a stabilizer precursor, and a polymerization initiator in a polymerization medium comprising carbon dioxide; and then (b) polymerizing the monomer and the stabilizer precursor in the polymerization medium to form a heterogeneous reaction mixture comprising a polymer in the polymerization medium. The stabilizer precursor is covalently bound the polymer to provide an intrinsic surfactant in the polymer, which stabilizes the polymer in the heterogeneous reaction mixture.

20 Claims, No Drawings

HETEROGENEOUS POLYMERIZATIONS IN CARBON DIOXIDE

RELATED APPLICATIONS

This application is a continuation of application Ser. No. 08/544,264, filed 17 Oct. 1995, now abandoned which is a continuation-in-part of U.S. patent application Ser. No. 08/443,478, filed May 18, 1995, U.S. Pat. No. 5,589,105 which is a divisional of U.S. patent application Ser. No. 08/378,550, filed Jan. 25, 1995, U.S. Pat. No. 5,506,317 which is a divisional of U.S. patent application Ser. No. 08/299,516, filed Sep. 1, 1994, U.S. Pat. No. 5,451,633 which is a divisional of U.S. patent application Ser. No. 08/198,224, filed Feb. 17, 1994, and now U.S. Pat. No. 5,382,623, which is a divisional of U.S. patent application Ser. No. 08/099,905, filed Jul. 30, 1993, and now U.S. Pat. No. 5,312,882, the disclosures of which are incorporated herein by reference in their entirety.

FIELD OF THE INVENTION

This invention relates generally to heterogeneous polymerizations carried out in a carbon dioxide continuous phase, and more specifically relates to heterogeneous polymerizations carried out in carbon dioxide in which a stabilizer reacts with the polymer formed during polymerization.

BACKGROUND OF THE INVENTION

Emulsion polymerization is a heterogeneous process often used by industry to polymerize a wide variety of monomers using free radical mechanisms. It involves the polymerization of monomers in the form of emulsion polymerizations or latexes. Polymers commonly formed by emulsions include acrylics, styrenics, polyvinylchloride (PVC), styrene-butadiene rubber, ethylene-propylene terpolymers (EDPM), polystyrene, acrylonitrile-butadiene-styrene copolymer (ABS), neoprene rubber, ethylene-vinyl acetate, styrene-maleic anhydride, tetrafluoroethylene, and vinyl fluoride.

Traditionally, heterogeneous polymerization processes have been conducted utilizing an aqueous or organic continuous phase. Recently however, environmental concerns have arisen with respect to the potential effects of the polymerization waste solutions typically discharged at the conclusion of traditional polymerization processes. In particular, the difficulty of removing residual organic monomers, surfactants and other materials from polymerization media discharge has prompted the industry to investigate more environmentally compatible alternatives. For example, U.S. Pat. Nos. 5,312,882 and 5,382,623 to DeSimone et al., the disclosures of which are incorporated herein by reference in their entirety, propose methods for preparing water-insoluble polymers by carrying out heterogeneous polymerization reactions in a continuous phase comprising carbon dioxide.

It is known that heterogeneous polymerizations conducted in any polymerization medium are improved by the addition of surfactants which stabilize the monomer and/or growing polymer particles in the polymerization medium to deter particle coagulation in the heterogeneous system. U.S. Pat. Nos. 5,312,882 and 5,382,623 to DeSimone et al. disclose a series of surfactants which are useful for stabilizing heterogeneous polymerizations in carbon dioxide. These surfactants are amphiphilic, having one segment which is soluble in the carbon dioxide continuous phase and one segment which is insoluble in the carbon dioxide continuous phase. For each monomer to be polymerized in the heterogeneous polymerization system, a new surfactant has been designed for the purpose of optimizing the efficiency of the surfactant in the polymerization system. For example, DeSimone et al., Science 265:356 (1994) has disclosed the use of poly(1,1-dihydroperfluorooctyl acrylate)|poly(FOA)| as a surfactant in the dispersion polymerization of methyl methacrylate in carbon dioxide.

There remains a need in the art for environmentally compatible polymerization systems. In addition, there remains a need in the art for compounds which are capable of stabilizing such polymerization systems.

SUMMARY OF THE INVENTION

As a first aspect, the present invention provides a method of carrying out the polymerization of a monomer. The method comprises (a) providing a reaction mixture comprising a monomer, a stabilizer precursor, and a polymerization initiator in a polymerization medium comprising carbon dioxide; and then (b) polymerizing the monomer and the stabilizer precursor in the polymerization medium to form a heterogeneous reaction mixture comprising a polymer in the polymerization medium. The stabilizer precursor is covalently bound to the polymer to provide an intrinsic surfactant in the polymer, which surfactant stabilizes the polymer in the heterogeneous reaction mixture. The stabilizer precursor is capable of covalently bonding to and reacting with the monomer, the polymer, or the initiator during the polymerization step.

As a second aspect, the present invention provides a polymer produced by the process outlined above.

These and other aspects of the present invention are described in detail in the detailed description set forth hereinbelow.

DETAILED DESCRIPTION OF THE INVENTION

The present invention is directed toward a method of carrying out the heterogeneous polymerization of a monomer and a stabilizer precursor which is capable of being polymerized in the polymer to provide an intrinsic surfactant in the polymer. The intrinsic surfactant in turn stabilizes the forming polymer in the heterogeneous reaction mixture during the polymerization step.

The steps of the method comprise providing a reaction mixture comprising monomer, stabilizer precursor, and a polymerization initiator in a polymerization medium comprising carbon dioxide ($CO_2$), and then polymerizing the monomer and stabilizer precursor in the reaction mixture to form a polymer.

As used herein, the term "polymer" refers to homopolymers, oligomers, and copolymers, depending upon the number of monomers which are employed. The term "heterogeneous reaction mixture" as used herein, refers to a reaction mixture having at least two phases. One phase is termed the "continuous phase", which comprises a fluid, and the other is termed the "dispersed phase", comprising the polymer or copolymer formed.

According to the method of the present invention, the polymerization reaction is initially homogeneous, wherein the monomer and stabilizer precursor are solubilized in the polymerization medium, and becomes heterogeneous as the polymerization proceeds and the polymer is formed. The newly forming polymer forms the dispersed phase of the reaction. The polymer is stabilized in the dispersed phase by the presence of the intrinsic surfactant which is formed by the polymerization of the stabilizer precursor and the monomer during the polymerization step. The intrinsic surfactant which is formed reduces the surface tension between the phases.

The term "heterogeneous reaction mixture" or "heterogeneous polymerization" is intended to encompass both dispersion polymerizations, in which the polymerization starts out homogeneous, and emulsion polymerizations, in which the polymerization starts out heterogeneous, and the polymerization initiator is preferentially solubilized in the continuous phase. As used herein, a compound is "preferentially solubilized" in one phase over another when it is more soluble in that phase.

The present invention is preferably carried out by dispersion polymerization. A dispersion polymerizaton starts as a one phase, homogeneous system where both the monomer and the initiator are soluble in the polymerization medium but the resulting polymer is not. Dispersion polymerizations are generally described in Barrett, K. E. J. *Dispersion Polymerization in Organic Media*; Wiley: London, 1975; and Napper, D. H. *Polymeric Stabilization of Colloidal Dispersions*; Academic Press: London, 1983, the disclosures of which are incorporated herein by reference in their entirety. As a result, the polymerization is initiated homogeneously and the resulting polymer phase separates into primary particles. These primary particles become stabilized by stabilizers present in the system that prevent particle flocculation and aggregation. Polymer colloids produced by dispersion polymerizations are usually stabilized by a "steric" mechanism as compared with an electrostatic mechanism that is common to collodial stabilizaton in aqueous environments. Steric stabilization of a collodial dispersion is usually imparted by amphiphilic macromolecules that become absorbed onto the surface of the dispersed phase. These amphiphilic macromolecules contain an anchoring segment, which attaches to the particle either by physical or chemical adsorption, and stabilizing moieties that are soluble in the continuous phase. The stabilizing moieties project into the continuouse phase to prevent flocculation and thereby impart stability to the colloid. Dispersion polymerizations are generally carried out in either an aqueous or an organic medium and lead to particles of collodial dimensions (i.e. 0.1 to 10 µm).

Monomers which are useful in the present invention include any of a wide variety of monomers known to those skilled in the art. For example, suitable monomers include vinyl monomers such as vinyl chloride and vinyl acetate; ethylene; acrylonitrile; dienes such as isoprene, chloroprene and butadiene; styrenics such as styrene and t-butyl styrene; acrylic monomers such as alkylmethyl acrylates and maleic anhydride; fluoroolefins such as perfluoroolefins, particularly tetrafluoroethylene, perfluoro(alkyl vinyl ethers) with perfluoroalkyl groups containing 1 to 6 carbon atoms and those containing functional groups such as $CF_2=CFOCF_2CF(CF_3)OCF_2CF_2SO_2F$ and $CF_2=CFOCF_2CF(CF_3)OCF_2CF_2CO_2CH_3$, hexafluoropropylene, perfluoro(2,2-dimethyldioxole), and partially fluorinated olefins, particularly vinyl fluoride, vinylidene fluoride, chlorotrifluoroethylene, and perfluoroalkyl ethylenes with perfluoroalkyl groups containing 1 to 6 carbon atoms. In addition, monomers that provide crosslinking and branching, such as divinyl benzene, di- and triacrylates, and acrylic acid, can also be included.

Particularly suitable monomers can be selected from the group consisting of styrene monomers, acrylic monomers, vinyl chloride monomers, olefinic monomers, fluoroolefinic monomers, and maleic anhydride monomers.

The monomer is typically present in the amount of from 1 to 70 percent by weight based upon the entire weight of the homogeneous reaction mixture. Two or more of the foregoing monomers may be employed in combination for the purpose of providing oligomers or copolymers. Any combination of monomers may be employed provided that the monomers selected are copolymerizable.

The stabilizer precursor is a compound which is capable of reacting with the monomer during the polymerization step to provide an intrinsic surfactant within the forming polymer. Once formed during the polymerization step, the intrinsic surfactant is capable of reducing the interfacial energy between the dispersed polymer phase and the continuous carbon dioxide polymerization medium phase. The presence of the formed intrinsic surfactant results in the formation of micron and submicron sized particles. The unpolymerized stabilizer precursor is incapable of acting as a surfactant. However, by polymerizing the monomer and the stabilizer precursor, the intrinsic surfactant is formed. After polymerization, the stabilizer precursor may be referred to as a surfactant, or a reactive stabilizer.

The stabilizer precursors include any of a variety of compounds which are capable of reacting with any of the monomer, the polymer, or the initiator to provide the intrinsic surfactant. Suitable stabilizer precursors may include macromonomers, macro-chain transfer agents, and macroinitiators. Preferably, the stabilizer precursor is a macromonomer which is capable of copolymerizing with the monomer.

Typically, the stabilizer precursor includes a segment which is soluble in carbon dioxide and a reactive segment which is capable of reacting with the monomer. The carbon dioxide soluble segment of the stabilizer precursor may include any of a variety of segments that are soluble in carbon dioxide. Examples of suitable carbon dioxide soluble segments include fluorine-containing or siloxane-containing segments. Suitable fluorine-containing segments include amorphous or low melting fluoropolymers.

As used herein, a "fluoropolymer" has its conventional meaning in the art. See generally *Fluoropolymers* (L. Wall, Ed. 1972) (Wiley-Interscience Division of John Wiley & Sons); see also *Fluorine-Containing Polymers*, 7 Encyclopedia of Polymer Science and Engineering 256 (H. Mark et al. Eds., 2d Ed. 1985). Exemplary fluoropolymers are those formed from: fluoroacrylate monomers such as 2-(N-ethylperfluorooctanesulfonamido)ethyl acrylate ("EtFOSEA"), 2-(N-ethylperfluorooctanesulfonamido)ethyl methacrylate ("EtFOSEMA"), 2-(N-methylperfluorooctanesulfonamido)ethyl acrylate ("MeFOSEA"), 2-(N-methylperfluorooctanesulfonamido) ethyl methacrylate ("MeFOSEMA"), 1,1-dihydroperfluorooctyl acrylate ("FOA"), and 1,1-dihydroperfluorooctyl methacrylate ("FOMA"); fluoroolefin monomers such as tetrafluoroethylene, vinylidene fluoride, vinyl fluoride, chlorotrifluoroethylene; fluorostyrene monomers such as α-fluorostyrene, β-fluorostyrene, α,β-difluorostyrenes, β,β-difluorostyrenes, α,β,β-trifluorostyrenes, α-trifluoromethylstyrenes, 2,4,6-tris (trifluoromethyl)styrene, 2,3,4,5,6-pentafluorostyrene, 2,3, 4,5,6-pentafluoro-α-methylstyrene, and 2,3,4,5,6-pentafluoro-β-methylstyrene; fluoroalkylene oxide monomers such as perfluoropropylene oxide and perfluorocyclohexene oxide; fluorinated vinyl alkyl ether monomers; and the copolymers thereof with suitable comonomers, wherein the comonomers are fluorinated or unfluorinated.

Examples of suitable siloxane-containing compounds include siloxanes having $C_1$–$C_6$ straight or branched chain alkyl, perfluoroalkyl, aryl, or alkylaryl groups, and alkoxy groups of the formula:

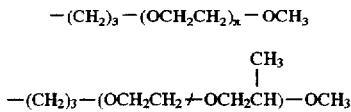

wherein x is a number from 1–50.

The stabilizer precursor includes at least one reactive segment in addition to the carbon dioxide soluble segment. However, the stabilizer precursor may include any suitable number of reactive segments. The reactive segment of the stabilizer precursor may include any of a variety of suitable segments known to those skilled in the art, which are capable of polymerizing with the monomer to form the intrinsic surfactant. Typically, at least one reactive segment is covalently attached to the carbon dioxide soluble segment.

Examples of suitable reactive segments include those described in U.S. Pat. No. 4,981,727 to Brinduse et al., the disclosure of which is incorporated herein by reference in its entirety. Typically, the reactive segments include a vinyl group or other group recognized by those skilled in the art as capable of polymerizing with the monomer by any of free radical, cationic, ring-opening metathesis, or step-growth polymerization mechanisms. Preferred reactive segments include, for example, $C_2$–$C_{12}$ alkenes; alkylidenes; phenyl substituted 1 or more times by unsaturated alkyl; alkoxyacryloyl; alkylthiol; alkylhalo; alkylcarboxy; halo; amino; H; hydroxy; alkylamino; or groups having the formula:

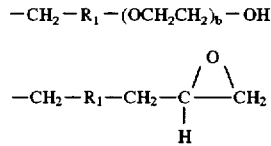

wherein $R_1$ is $C_1$–$C_{12}$ alkylene.

Specific examples of preferred stabilizer precursors include, but are not limited to, vinyl functional poly(dimethylsiloxane), allyl functional poly(dimethylsiloxane), 1-hexenyl functional poly(dimethylsiloxane), vinylphenyl functional polydimethylsiloxane, vinyl benzyl terminated poly(dimethylsiloxane), vinyl terminated poly(dimethylsiloxane), methacryloxypropyl functional poly(dimethylsiloxane), acryloxypropyl functional poly(dimethylsiloxane), mercapto functional poly(dimethylsiloxane), divinyl functional poly(dimethylsiloxane), vinyl terminated diphenylsiloxane-dimethylsiloxane copolymer, vinylmethylsiloxane-dimethylsiloxane copolymer, methacroloyl terminated poly(1,1-dihydroperfluorooctyl methacrylate) ("FOMA"), methacryloyl terminated poly[2-(N-ethylperfluorooctanesulfonamido ethyl methacrylate], methacryloyl terminated poly[2-(N-methylperfluorooctanesulfonamido)ethyl methacrylate], methacryloyl terminated poly(1,1',2,2'-tetrahydroperfluoroalkyl methacrylate), mercapto functional poly[2-(N-ethylperfluorooctanesulfonamido) ethyl acrylate], mercapto functional poly[2-(N-methylperfluorooctanesulfonamido)ethyl acrylate], mercapto functional poly(1,1',2,2'-tetrahydroperfluoroalkyl acrylate) and mercapto functional poly(1,1'-dihydroperfluorooctyl acrylate). Particularly preferred stabilizer precursors include, but are not limited to, poly(dimethylsiloxane)monomethacrylate, dimethylvinylsilyl poly(dimethylsiloxane), mercaptopoly(dimethylsiloxane), vinyl benzyl terminated poly(dimethylsiloxane), vinyl terminated poly(dimethysiloxane) and methacryloyl terminated poly(1,1-dihydroperfluorooctyl methacrylate).

Preferably, the stabilizer precursor is present in the reaction mixture at a concentration ranging from 0.05 to 10 percent by weight based upon the total weight of the homogeneous reaction mixture.

The reaction mixture preferably also includes a free radical initiator capable of initiating and/or accelerating the polymerization. The initiator is included in the solution in a concentration ranging from 0.001 to 20 percent by weight of the homogeneous mixture.

Those skilled in this art will be familiar with a number of initiators that are soluble in the polymerization medium. Organic free radical initiators are preferred and include, but are not limited to, the following: acetylcyclohexanesulfonyl peroxide; diacetyl peroxydicarbonate; dicyclohexyl peroxydicarbonate; di-2-ethylhexyl peroxydicarbonate; tert-butyl perneodecanoate; 2,2'-azobis (4-methoxy-2,4-dimethylvaleronitrile; tert-butyl perpivalate; dioctanoyl peroxide; dilauroyl peroxide; 2,2'-azobis (2,4-dimethylvaleronitrile); tert-butylazo-2-cyanobutane; dibenzoyl peroxide; tert-butyl per-2-ethylhexanoate; tert-butyl permaleate; 2,2'-azobis (isobutyronitrile); bis(tert-butylperoxy) cyclohexane; tert-butyl peroxyisopropylcarbonate; tert-butyl peracetate; 2,2'-bis (tert-butylperoxy) butane; dicumyl peroxide; ditert-amyl peroxide; di-tert-butyl peroxide; p-methane hydroperoxide; pinane hydroperoxide; cumene hydroperoxide; and tert-butyl hydroperoxide. Other suitable initiators include halogenated free-radical initiators such as chlorocarbon based and fluorocarbon based acyl peroxides such as trichloroacetyl peroxide, bis(perfluoro-2-propoxy propionyl) peroxide, $[CF_3CF_2CF_2OCF(CF_3)COO]_2$, perfluoropropionyl peroxides, $(CF_3CF_2CF_2COO)_2$, $(CF_3CF_2COO)_2$, $\{(CF_3CF_2CF_2)[CF(CF_3)CF_2O]_nCF(CF_3)COO\}_2$, $[ClCF_2(CF_2)_nCOO]_2$, and $[HCF_2(CF_2)_nCOO]_2$ where n=0–8; perfluoroalkyl azo compounds such as perfluoroazoisopropane, $[(CF_3)_2CFN=]_2$; $R_4N=NR_4$, where $R_4$ is a linear or branched perfluorocarbon group having 1–8 carbons; stable or hindered perfluoroalkane radicals such as hexafluoropropylene trimer radical, $[(CF_3)_2CF]_2(CF_2CF_2)C$, radical and perfluoroalkanes.

Redox systems such as dimethylaniline-benzoyl peroxide, diethylaniline-benzoyl peroxide and diphenylamine-benzoyl peroxide can also be used to initiate the polymerization.

The preferred initiators are 2,2'-azobis(isobutyro-nitrile) ("AIBN"), and 2,2'-azobis(4-methoxy-2,4-dimethylvaleronitrile).

The polymerization medium of the present invention comprises carbon dioxide. The carbon dioxide can be employed in a liquid, vapor, or supercritical phase. If liquid carbon dioxide is used, the temperature of the reaction should be below 31° C. Preferably, the carbon dioxide is in a liquid or "supercritical" phase. As used herein, "supercritical" means that a fluid medium is at a temperature that is sufficiently high that it cannot be liquified by pressure. The thermodynamic properties of carbon dioxide are reported in Hyatt, J. Org. Chem. 49:5097–5101 (1984); therein, it is stated that the critical temperature of carbon dioxide is about 31° C. The reaction temperature should be chosen to provide sufficient heat energy to initiate and propagate the polymerization. Preferably, the reaction temperature will be between −50° C. and 200° C., and more preferably will be between −20° C. and 100° C.

The advantage of conducting the polymerization with supercritical carbon dioxide stems from the tendency of the solvent strength in a supercritical phase to be easily manipulated by varying the pressure of the fluid. For the purposes of the invention, the pressure will preferably be between 15 to 45,000 psi, and more preferably between 200 and 10,000 psi. As a result of this phenomenon, the use of supercritical carbon dioxide permits one carrying out the polymerization to significantly influence the particle size, distribution, and other aspects of the final product without varying either the solvent temperature or composition (i.e., including a co-solvent).

The polymerizing step of the present invention can be carried out by polymerization methods using apparatus and conditions known to those skilled in this art. Similar apparatus and conditions may also be utilized during the step in which the reactive stabilizer reacts and becomes bonded to the polymer. For example, these steps may be carried out batchwise or continuously with thorough mixing of the reactants (i.e., initiator, monomer or monomers, and reactive stabilizer) in any appropriate high pressure vessel. In particular, it has been found that employing a continuous or semi-batch reactor may be useful to control polymer composition and composition distribution and may be useful in the copolymerization of two monomers with different reactivities.

Typically, the polymerization can be carried out by charging the reaction vessel with monomer, stabilizer precursor, initiator, and carbon dioxide, closing the reaction vessel, and bringing the reaction mixture to an appropriate temperature and pressure. In the above embodiment, it should be noted that only part of the reaction mixture may be introduced into the reaction vessel and heated to the polymerization temperature and brought to the polymerization pressure, with additional reaction mixture being added at a rate corresponding to the rate of polymerization. As an alterative, the initiator, and some of each of the monomer and stabilizer precursor may be initially introduced into the reaction vessel and brought to temperature and pressure, with additional monomer and/or stabilizer precursor being added at the rate at which polymerization proceeds.

Typically the mixture is allowed to polymerize for between about 2 and 24 hours, and preferably is stirred as the reaction proceeds. During this time, the stabilizer precursor reacts with any of the monomer, the polymer, or the initiator to form an intrinsic surfactant. In one embodiment, the stabilizer precursor is copolymerized with the monomer to form the intrinsic surfactant in the polymer. At the conclusion of the polymerization, the polymer can be collected by methods such as venting of the polymerization medium or by fractionation. Additionally, a portion of the stabilizer precursor that is not copolymerized with the monomer may be recovered from the carbon dioxide and polymer mixture by fractionation, by reducing temperature and pressure, and thus is able to be reused.

After separation, the polymer can be collected by conventional means. In addition, the polymers of the present invention may be retained in the carbon dioxide polymerization medium or re-dispersed in a carbon dioxide medium, and sprayed onto a surface. After the carbon dioxide evaporates, the polymer forms a coating on the surface.

The polymer formed by the present invention can also be used to form molded articles, such as valves and bottles, films, fibers, resins, and matrices for composite materials.

The following examples are provided to illustrate the present invention, and should not be construed as limiting thereof. In these examples, "M" means molar concentration, "NMR" means nuclear magnetic resonance, "GPC" mean gel permeation chromatography, "mg" means milligrams, "g" means grams, "mol" means moles, "g/mole" means grams per mole, "mL" means milliliters, "°C." means degrees Celsius, "psi" means pounds per square inch, "$M_n$" means number average molecular weight, "MWD" means molecular weight distribution, "ppm" means parts per million, "µm" means micrometers, "AIBN" means 2,2'-azobis(isobutyronitrile), "CoBF2.H2O" means Cobaloximeborondifluoride.$H_2O$, "PDMS" means poly (dimethylsiloxane), and "poly(FOMA)" means poly(1,1'-dihydroperfluorooctyl methacrylate).

The monomers used in the following examples were deinhibited with aluminum oxide. A tetrahydrofuran solution of PDMS macromonomer (i.e, PDMS having a methacrylate end group) was deinhibited in a similar manner and the tetrahydrofuran was removed in vacuo. $^1$H NMR spectroscopy was used to verify that the PDMS macromonomer did not contain residual tetrahydrofuran. AIBN was recrystallized twice from methanol. 2,2'-Azobis(4-methoxy-2,4-dimethylvaleronitrile) was recrystallized once from cold chloroform/pet ether prior to use. Cobaloximeborondifluoride.$H_2O$ is prepared according to the method described in U.S. Pat. No. 4,694,054 to Janowicz, and was recrystallized twice from methanol prior to use.

EXAMPLE 1

Heterogeneous Polymerization with PDMS Macromonomer 2,2'-Azobis(isobutyronitrile) (0.0071 g), 0.1518 g of PDMS macromonomer having a methacrylate terminus and a number average molecular weight of 11.3×10$^3$ g/mole, and a stir bar are added to a 10 mL high pressure view cell. After purging the cell with argon for 15 minutes, 2.1 g of deoxygenated methyl methacrylate is added. The cell is pressurized with carbon dioxide to a pressure of ca. 1600 psi. The contents of the cell are stirred. The cell is heated to 65° C. and additional carbon dioxide is added to achieve a cell pressure of 4930 psi at a temperature of 65° C. The reaction is allowed to proceed for 4 hours, after which time the cell is immersed in a water bath and the carbon dioxide is quickly vented from the cell. The cell is cooled to room temperature, and the resulting polymer, obtained in 87% yield, is a course white powder having a number average molecular weight of 3.01×10$^5$ g/mole and a molecular weight distribution of 2.4. Using scanning electron microscopy, the polymer product is shown to be comprised of polymer particles having a diameter of ca. 2.5 µm. $^1$H NMR spectroscopy indicates a polymer content of 7.3 weight percent PDMS.

EXAMPLE 2

Polymer Wash

The polymer prepared in Example 1 (0.050 g) is stirred in 20 mL hexanes at room temperature for 23 hours. The washed product is recovered by filtration and dried in vacuo. The morphology of the product is substantially unchanged by washing, while the number average molecular weight increases to 3.86×10$^5$ g/mole and the molecular weight distribution decreases to 2.1. $^1$H NMR spectroscopy indicates a polymer content of 0.24 weight percent PDMS.

EXAMPLE 3

Polymer Extraction

The polymer prepared according to Example 1 (0.0735 g) is extracted with carbon dioxide at room temperature and a pressure of 5000 psi at a flow rate of 1–2 mL/min for ca. 4 hours. The morphology of the product is substantially unaffected by the extraction. The material extracted from the product is identified as PDMS macromonomer by $^1$H NMR spectroscopy. $^1$H NMR spectroscopy indicates a polymer content of 0.26 weight percent PDMS.

EXAMPLE 4

Heterogeneous Polymerization with PDMS Macromonomer

The polymerization is carried out as in Example 1, with the exception that 0.399 g of PDMS macromonomer having a methacrylate terminus is employed. The polymerization produces 88% yield of polymer in the form of a coarse white powder having a number average molecular weight of $2.22 \times 10^5$ g/mole and a molecular weight distribution of 3.8. The product is comprised of polymer particles with an approximate diameter of 1.0 mm which are coated with excess PDMS macromonomer which is not covalently attached to the particles. $^1$H NMR spectroscopy indicates a polymer content of 17 weight percent PDMS.

The polymer particles are extracted to remove excess PDMS macromonomer. Washing produces polymer particles having a diameter of ca. 1.0 µm which are no longer coated with excess PDMS macromonomer. $^1$H NMR spectroscopy indicates a polymer content of 0.68 weight percent PDMS. The number average molecular weight of the polymer after extraction is $3.63 \times 10^5$ g/mole and the molecular weight distribution is 2.3.

EXAMPLE 5

Heterogeneous Polymerization with PDMS Macromonomer

The polymerization is carried out as in Example 1, with the exception that 0.001 g of PDMS macromonomer having a methacrylate terminus is employed. Polymer is obtained in 56% yield as a hard white solid with a number average molecular weight of $1.81 \times 10^5$ g/mole.

EXAMPLE 6

Comparative Example

The polymerization is carried out as in Example 1, except that PDMS macromonomer is omitted from the reaction mixture. The resulting polymer is obtained in a 24% yield in the form of a clear, tacky polymer having a number average molecular weight of $6.5 \times 10^4$ g/mole.

EXAMPLE 7

Heterogeneous Polymerization with PDMS Macromonomer

The polymerization is carried out as in Example 1, with the exception that 0.0401 g of AIBN, 0.0506 g of PDMS macromonomer and 2.0 g of styrene are employed and the reaction is carried out for 24 hours. A white powdery polymer product containing a small amount of soft, tacky material is obtained in 71% yield. The number average molecular weight of the resulting polymer is $1.8 \times 10^4$ g/mole and the molecular weight distribution is 3.1.

EXAMPLE 8

Heterogeneous Polymerization with PDMS Macromonomer

The polymerization is carried out as in Example 1, with the exception that 0.0200 g AIBN, 0.152 g PDMS macromonomer, 1.1 g butyl acrylate and 1.1 g methyl methacrylate are employed. The resulting copolymer forms a stable latex in carbon dioxide which does not settle when stirring is discontinued. At the end of the reaction, the carbon dioxide is quickly vented onto a sheet of aluminum where the polymer forms a thin, opaque, non-tacky film. The number average molecular weight of the resulting polymer is $2.0 \times 10^4$ g/mole and the molecular weight distribution was 1.7.

EXAMPLE 9

Heterogeneous Polymerization with PDMS Macromonomer

The polymerization is carried out as in Example 1, with the exception that 0.054 g of PDMS macromonomer and 0.065 g 2,2'-azobis(4-methoxy-2,4-dimethylvaleronitrile) are employed, and the reaction is carried out at 30° C. and 1000 psi for 21 hours. The resulting polymer is obtained in 92% yield in the form of a fine white powder having an approximate average diameter of 6 µm, a number average molecular weight of $1.2 \times 10^5$ g/mole and a molecular weight distribution of 2.3.

EXAMPLE 10

Heterogeneous Polymerization with PDMS Macromonomer

The polymerization is carried out as in Example 1, with the exception that 0.154 g of PDMS macromonomer and 0.065 g 2,2'-azobis(4-methoxy-2,4-dimethylvaleronitrile) are employed, and the reaction is carried out at 30° C. and 1000 psi for 21 hours. The resulting polymer is obtained in 89% yield in the form of a fine white powder having an approximate average diameter of 3 µm, a number average molecular weight of $1.5 \times 10^5$ g/mole and a molecular weight distribution of 2.3.

EXAMPLE 11

Heterogeneous Polymerization with PDMS Macromonomer

The polymerization is carried out as in Example 1, with the exception that 0.200 g of a monovinyl terminated PDMS macromonomer with a number average molecular weight of $34.3 \times 10^3$ g/mole, 0.040 g of AIBN, and 2.0 g vinyl acetate are employed. A tacky white material is obtained in 53% yield. The product is comprised of spherical particles which have an approximate average diameter of 10 µm, a number average molecular weight of $2.8 \times 10^3$ g/mole, and a molecular weight distribution of 3.0.

EXAMPLE 12

Heterogeneous Polymerization with PDMS Macromonomer

The polymerization is carried out as in Example 1, with the exception that 0.100 g of a monovinyl terminated PDMS macromonomer with a number average molecular weight of $34.3 \times 10^3$ g/mole, 0.040 g of AIBN, and 2.0 g vinyl acetate are employed and the reaction is carried out for 18 hours. A coarse white powder is obtained in 92.1% yield. The product is comprised of spherical particles which have an average diameter of about 1 µm, a number average molecular weight of $13.7 \times 10^3$ g/mole, and a molecular weight distribution of 5.2.

EXAMPLE 13

Heterogeneous Polymerization with PDMS Macromonomer

The polymerization is carried out as in Example 1, with the exception that 0.100 g of a monovinyl terminated PDMS macromonomer with a number average molecular weight of $37.0 \times 10^3$ g/mole, 0.040 g of AIBN, and 1.8 g vinyl acetate and 0.20 g ethylene are employed and the reaction is carried out for 18 hours. The product, a white solid, is obtained in 81.2% yield and has a number average molecular weight of $9.6 \times 10^3$ g/mole and a molecular weight distribution of 3.3. $^1$H NMR spectroscopy indicates that the product is copolymer comprised of 26.2 mole percent ethylene and 73.8 mole percent vinyl acetate repeat units.

EXAMPLE 14

Preparation of Methacryloyl Terminated Poly(1,1'-dihydroperfluorooctyl Methacrylate)

Fluoroalkyl methacrylate macromonomers are prepared in acetone through the polymerization of 1,1'-dihydroperfluorooctyl methacrylate in the presence of $4.1 \times 10^{-5}$ M $CoBF_2.H_2O$ using 2% by weight, based on FOMA, AIBN as the initiator. Reagents are mixed in air and subjected to 3 freeze-pump-thaw cycles before heating to 65° C. for 8 hours. After the allotted reaction time, the mixture is poured slowly with stirring into a large excess of methanol to remove acetone, monomer, catalyst, and residual initiator. The methanol is decanted and the resulting product is re-dissolved in α,α,α-trifluorotoluene, precipitated into methanol and dried overnight under vacuum at room temperature. $^1$H NMR indicates a methacryloyl terminated poly(FOMA) with a number average molecular weight of 4,900 g/mole.

EXAMPLE 15

Preparation of Methacryloyl Terminated Poly(1,1'-dihydroperfluorooctyl Methacrylate)

The polymerization is carried out as in Example 12, with the exception that $2.8 \times 10^{-5}$ M $CoBF_2.H_2O$ is employed. $^1$H NMR analysis of the resulting polymer indicates a methacryloyl terminated poly(FOMA) having a number average molecular weight of 6,400 g/mole.

EXAMPLE 16

Preparation of Methacryloyl Terminated Poly(1,1'-dihydroperfluorooctyl Methacrylate)

The polymerization is carried out as in Example 12, with the exception that $1.4 \times 10^{-5}$ M $CoBF_2.H_2O$ is employed. $^1$H NMR analysis of the resulting polymer indicates a methacryloyl terminated poly(FOMA) having a number average molecular weight of 11,000 g/mole.

EXAMPLE 17

Preparation of Methacryloyl Terminated Poly(1,1'-dihydroperfluorooctyl Methacrylate)

The polymerization is carried out as in Example 12, with the exception that $0.55 \times 10^{-5}$ M $CoBF_2.H_2O$ is employed. $^1$H NMR analysis of the resulting polymer indicates a methacryloyl terminated poly(FOMA) having a number average molecular weight of 14,000 g/mole.

EXAMPLE 18

Heterogeneous Polymerization with Methacryloyl Terminated with Poly(FOMA)

A 25-mL high pressure reactor is charged with 20 mg AIBN and 1.3 g methacryloly terminated poly(FOMA) prepared according to Example 12 using 3.6 ppm $COBF_2.H_2O$. Methyl methacrylate (2.7 mL) injected into the cell via syringe. The cell is purged with argon and sealed. Carbon dioxide is added to fill approximately one half of the cell volume. The cell is heated to 65° C. and additional carbon dioxide is added to achieve a cell pressure of 4000 psi. After four hours, the carbon dioxide is vented and 3.0 grams of white powder is collected. Analysis by SEM indicates approximately 1 μm particles of poly(methyl methacrylate). GPC analysis indicates a number average molecular weight of $1.8 \times 10^5$ g/mole.

EXAMPLE 19

Heterogeneous Polymerization with Methacryloyl Terminated with Poly(FOMA)

A 25-mL high pressure reactor is charged with 2.0 g of methyl methacrylate, 3.0 g of methacryloyl terminated poly (FOMA) and 50 mg AIBN. The cell is purged with argon and sealed. Carbon dioxide is added to fill approximately one half of the cell volume and the cell is heated to 60° C. for three days. At the end of the reaction, a cloudy phase-separated mixtures is obtained. The carbon dioxide is vented and 3.3 g of polymer is collected corresponding to a 66% yield. $^1$H NMR analysis confirms that methacryloyl terminated poly (FOMA) is incorporated into the resulting polymer product.

The foregoing is illustrative of the present invention and is not to be construed as limiting thereof. The invention is defined by the following claims, with equivalents of the claims to be included therein.

That which is claimed is:

1. A method of carrying out the polymerization of a monomer, the method comprising:

(a) providing a reaction mixture comprising a monomer, a stabilizer precursor, and a polymerization initiator in a polymerization medium comprising carbon dioxide; and then (b) polymerizing said monomer and said stabilizer precursor in said polymerization medium to form a heterogenous reaction mixture comprising a polymer in said polymerization medium;

and wherein said stabilizer precursor is covalently bound to said polymer to provide an intrinsic surfactant in said polymer, which surfactant stabilizes said polymer in said heterogenous reaction mixture.

2. The method according to claim 1, wherein said monomer is selected from the group consisting of vinyl monomers, diene monomers, styrene monomers, acrylic monomers, olefinic monomers, fluoroolefinic monomers, and maleic anhydride monomers.

3. The method according to claim 1, wherein said initiator is a free radical initiator.

4. The method according to claim 1, wherein said initiator is selected from the group consisting of acetylcyclohexanesulfonyl peroxide, diacetylperoxydicarbonate, dicyclohexyl peroxydicarbonate, di-2-ethylhexyl peroxydicarbonate, tert-butyl perneodecanoate, 2,2'-azobis(4-methoxy-2,4-dimethylvaleronitrile), tert-butyl perpivalate, dioctanoyl peroxide, dilauroyl peroxide, 2,2'-azobis(2,4- dimethylvaleronitrile), tert-butylazo-2-cyanobutane, dibenzoyl peroxide, tert-butyl per-2-ethylhexanoate, tert-butyl permaleate, 2,2'-azobis(isobutyronitrile), bis(tert-butylperoxy) cyclohexane, tert-butyl peroxyisopropylcarbonate, tert-butyl peracetate, 2,2-bis (tert-butylperoxy) butane, dicumyl peroxide, ditert-amyl peroxide, di-tert-butyl peroxide, p-methane hydroperoxide, pinane hydroperoxide, cumene hydroperoxide, tert-butyl hydroperoxide, bis(perfluoro-2-propoxy propionyl) peroxide, perfluoropropionyl peroxide, perfluoroazoisopropane, and hexafluoropropylene trimer radical.

5. The method according to claim 1, wherein said initiator is 2,2'-azobis(isobutyronitrile).

6. The method according to claim 1, wherein said initiator is 2,2'-azobis(4-methoxy-2,4-dimethylvaleronitrile).

7. The method according to claim 1, wherein said polymerization medium comprises liquid carbon dioxide.

8. The method according to claim 1, wherein said polymerization medium comprises supercritical carbon dioxide.

9. The method according to claim 1, wherein said stabilizer precursor is copolymerized with said monomer during said polymerizing step, to provide an intrinsic surfactant in said polymer.

10. The method according to claim 1, wherein said stabilizer precursor comprises a polymer having at least one reactive group capable of reacting with said monomer, polymer, or initiator during said polymerization step.

11. The method according to claim 1, wherein said stabilizer precursor comprises a macromonomer having at least one reactive group capable of reacting with said monomer, said polymer, or said initiator during said polymerization step.

12. The method according to claim 1, wherein said stabilizer precursor comprises a carbon dioxide-soluble segment and a reactive group capable of reacting with said monomer, said polymer, or said initiator during said polymerization step.

13. The method according to claim 12, wherein said carbon dioxide soluble segment is selected from the group consisting of fluorine-containing and siloxane-containing segments, and said reactive group is selected from the group consisting of $C_2$–$C_{12}$ alkenes; alkylidenes; phenyl substituted 1 or more times by unsaturated alkyl; alkoxyacryloyl; alkylthiol; alkylhalo; alkylcarboxy; halo; amino; H; hydroxy; alkylamino; and groups having a formula selected from the group consisting of:

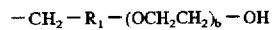

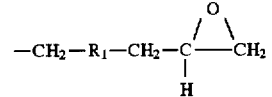

wherein $R_1$ is $C_1$–$C_{12}$ alkylene.

14. The method according to claim 1, wherein said stabilizer precursor is selected from the group consisting of poly(dimethylsiloxane)-monomethacrylate, dimethylvinylsilyl poly(dimethylsiloxane), mercaptopoly (dimethylsiloxane), vinyl benzyl terminated poly (dimethylsiloxane), vinyl terminated poly (dimethylsiloxane), and methacryloyl terminated poly(1,1-dihydroperfluorooctyl methacrylate).

15. The method according to claim 1, further comprising the step of removing the unreacted stabilizer precursor.

16. The method according to claim 1, further comprising the step of isolating the polymer.

17. The method according to claim 16, wherein said step of isolating the polymer comprises venting the polymerization medium to the atmosphere.

18. A polymer produced by the process according to claim 1.

19. A mixture comprising carbon dioxide liquid having a polymer stabilized therein, said polymer comprising the polymerization product of a monomer and a stabilizer precursor, wherein said stabilizer precursor provides an intrinsic surfactant in said polymer, which surfactant stabilizes said polymer in said mixture.

20. A mixture according to claim 19, which mixture is a colloid comprising a carbon dioxide continuous phase and a polymer discrete phase.

* * * * *